United States Patent
Ishihara et al.

(10) Patent No.: US 8,266,416 B2
(45) Date of Patent: Sep. 11, 2012

(54) DYNAMIC RECONFIGURATION SUPPORTING METHOD, DYNAMIC RECONFIGURATION SUPPORTING APPARATUS, AND DYNAMIC RECONFIGURATION SYSTEM

(75) Inventors: Koji Ishihara, Kawasaki (JP); Tetsuo Kawano, Kawasaki (JP); Kyoji Sato, Kawasaki (JP); Tsuguchika Tabaru, Kawasaki (JP); Manabu Matsuyama, Kawasaki (JP); Ryuichi Ohzeki, Kawasaki (JP); Masato Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 848 days.

(21) Appl. No.: 12/332,792

(22) Filed: Dec. 11, 2008

(65) Prior Publication Data

US 2009/0164773 A1    Jun. 25, 2009

(30) Foreign Application Priority Data

Dec. 19, 2007    (JP) ................................. 2007-327818

(51) Int. Cl.
*G06F 9/00* (2006.01)
(52) U.S. Cl. ................. 713/1; 713/2; 713/100
(58) Field of Classification Search .................. 713/1, 2, 713/100
See application file for complete search history.

(56) References Cited

U.S. PATENT DOCUMENTS

| | | | |
|---|---|---|---|
| 5,535,342 A | | 7/1996 | Taylor |
| 7,493,472 B2 * | | 2/2009 | Baxter ............................ 712/43 |
| 7,937,172 B2 * | | 5/2011 | Nakayama ...................... 700/86 |
| 7,937,665 B1 * | | 5/2011 | Vazquez et al. ............... 715/763 |
| RE42,444 E * | | 6/2011 | Smith et al. ........................ 713/1 |
| 2007/0247188 A1 * | | 10/2007 | Nomura et al. ................. 326/39 |
| 2008/0168465 A1 * | | 7/2008 | Tanaka ........................... 718/105 |
| 2009/0133028 A1 * | | 5/2009 | Brown et al. .................. 718/104 |

FOREIGN PATENT DOCUMENTS

| | | |
|---|---|---|
| EP | 1 235 152 | 8/2002 |
| JP | 2002-259157 | 9/2002 |
| JP | 3845021 | 8/2006 |
| JP | 2006-285386 | 10/2006 |
| WO | 94/10627 | 5/1994 |
| WO | 02/095946 | 11/2002 |

* cited by examiner

*Primary Examiner* — M Elamin
(74) *Attorney, Agent, or Firm* — Staas & Halsey LLP (57) ABSTRACT

A dynamic reconfiguration supporting method that generates a driver function to cause a dynamic reconfiguration circuit to execute a program of an application described in a predetermined language, includes acquiring a configuration defining file representing a configuration of a cluster of the dynamic reconfiguration circuit in execution of the process of the application, generating an address map representing an address of a processing element (to be referred to as "PE" hereinafter) in the cluster on the basis of the configuration defining file acquired by the acquiring operation, generating a driver function that associates the function and an address of the PE which executes the function with reference to the address map, when a PE which executes a function described in the application is allocated from the PE, and creating a driver function file that stores the driver function.

2 Claims, 13 Drawing Sheets

CLUSTER 0

| ADDRESS | ELEMENT |
|---|---|
| 0x101000 | RAM0 |
| 0x102000 | RAM1 |
| 0x103000 | RAM2 |

CLUSTER 1

| ADDRESS | ELEMENT |
|---|---|
| 0x111000 | RAM0 |
| 0x112000 | RAM1 |

```
define RC0_BASE_ADDRESS        0x100000 define RC0_CL0_DRF0           (RC0_BASE_ADDRESS + 0x00100)
define RC0_CL0_DRF1           (RC0_BASE_ADDRESS + 0x00200)

#define RC0_CL0_RAM0           (RC0_BASE_ADDRESS + 0x01000)
#define RC0_CL0_RAM1           (RC0_BASE_ADDRESS + 0x02000)
#define RC0_CL0_RAM2           (RC0_BASE_ADDRESS + 0x03000)

#define RC0_CL1_DRF0           (RC0_BASE_ADDRESS + 0x10100)
#define RC0_CL1_DRF1           (RC0_BASE_ADDRESS + 0x10200)

#define RC0_CL1_RAM0           (RC0_BASE_ADDRESS + 0x11000)
#define RC0_CL1_RAM1           (RC0_BASE_ADDRESS + 0x12000)
```

```
int func_abc(unsigned short input [], unsigned short output [], int length)
{
    int valueA[100];  ⎤
    int valueB[100];  ⎬ ~910
    int valueC[100];  ⎦
    int ret;

for (int i = 0; i < length; i++)
    {
        output[i] = input[length – i – 1];
    }
    ...

return ret;
}
```

```
function=func_abc;
parameter=input,1,RAM,0;
parameter=output,1,RAM,1;
parameter=length,0,DRF,0;
variable=valueA,0,RAM,0;
variable=valueB,0,RAM,1;
variable=valueC,0,RAM,2;
return=,0,DRF,1;
```

```
#include <AddrMap.p>
int set_param_func_abc_input(const unsigned short * input, size_t size)
{
        return write_ram(RC0_CL1_RAM0, input, size);                    ~1110
}
int get_param_func_abc_input(unsigned short * input, size_t size)
{
        return read_ram(RC0_CL1_RAM0, input, size);                     ~1120
}
int set_param_func_abc_output(const unsigned short * output, size_t size)
{
        return write_ram(RC0_CL1_RAM1, output, size);                   ~1130
}
int get_param_func_abc_output(unsigned short * output, size_t size)
{
        return read_ram(RC0_CL1_RAM1, output, size);                    ~1140
}
int set_param_func_abc_length(int length)
{
        return write_drf(RC0_CL0_DRF0, length);                         ~1150
}
int get_return_func_abc(void)
{
        return read_drf(RC0_CL0_DRF1);                                  ~1160
}
```

DYNAMIC RECONFIGURATION SUPPORTING METHOD, DYNAMIC RECONFIGURATION SUPPORTING APPARATUS, AND DYNAMIC RECONFIGURATION SYSTEM

CROSS-REFERENCE TO RELATED APPLICATIONS

This application is based upon and claims the benefit of priority from the prior Japanese Patent Application No. 2007-327818 filed on Dec. 19, 2007, the entire contents of which are incorporated herein by reference.

BACKGROUND

1. Field

A dynamic reconfiguration supporting method that supports process execution of a dynamic reconfiguration circuit constituted by a cluster including a processing element (Processing Element) (to be referred to as a "PE" hereinafter), a dynamic reconfiguration supporting apparatus, and a dynamic reconfiguration system.

2. Description of the Related Art

A dynamic reconfiguration system has been provided in the past. A dynamic reconfiguration system can cause a single circuit to execute a plurality of processes having different processing contents by using a dynamic reconfiguration circuit. A dynamic reconfiguration circuit can dynamically change processing contents. The dynamic reconfiguration circuit using the dynamic reconfiguration system includes PEs of a plurality of types. Each of the types of PEs has functions for performing various arithmetic operations, data storage, and a count process and a network circuit that connects the PEs of the types.

International Publication Patent No. WO2002/095946 describes a dynamic reconfiguration circuit that is reconfigured as a circuit. The dynamic reconfiguration circuit fulfills the functions of the PEs and processing content/performance/power consumption set by a user by changing connections between the PEs in execution of a process.

SUMMARY

According to one aspect of an embodiment, there is provided a dynamic reconfiguration supporting method that generates a driver function to cause a dynamic reconfiguration circuit to execute a program of an application described in a predetermined language, including acquiring a configuration defining file representing a configuration of a cluster of the dynamic reconfiguration circuit in execution of the process of the application, generating an address map representing an address of a processing element (to be referred to as "PE" hereinafter) in the cluster on the basis of the configuration defining file acquired by the acquiring operation, generating a driver function that associates the function and an address of the PE which executes the function with reference to the address map, when a PE which executes a function described in the application is allocated from the PE, and creating a driver function file that stores the driver function.

According to another aspect of an embodiment, there is provided a dynamic reconfiguration supporting apparatus that supports execution of a process of an application described in a predetermined language, a circuit configuration of a dynamic reconfiguration circuit including a cluster having a processing element (to be referred to as a "PE" hereinafter) being able to be changed, an acquirer that acquires a configuration defining file representing a configuration of a cluster of the dynamic reconfiguration circuit in execution of the process of the application, an address map generator that generates an address map representing an address of a processing element in the cluster on the basis of the configuration defining file acquired by the acquirer, a driver function generator that, when a PE which executes a function described in the application is allocated from the PE, generates a driver function that associates the function and an address of the PE which executes the function with reference to the address map, a driver function file creator that creates a driver function file in that a driver function generated by the driver function generator is described, and a storage that stores the driver function file created by the driver function file creator in a predetermined memory.

The above-described embodiments of the present invention are intended as examples, and all embodiments of the present invention are not limited to including the features described above.

DETAILED DESCRIPTION OF THE PREFERRED EMBODIMENTS

Reference may now be made in detail to embodiments of the present invention, examples of which are illustrated in the accompanying drawings, wherein like reference numerals refer to like elements throughout.

Preferred embodiments of a dynamic reconfiguration supporting method, a dynamic reconfiguration circuit, and a dynamic reconfiguration system will be described below in detail. In the embodiments, a dynamic reconfiguration system will be described as an example to execute a predetermined process on a dynamic reconfiguration circuit. The dynamic reconfiguration system writes an application written in the C language by a user in an LSI chip including a dynamic reconfiguration circuit to execute the application. However, the dynamic reconfiguration system can also execute an application written in another high-level language. A CPU is caused to execute a program to control the dynamic reconfiguration circuit and access PEs (RAM or DRF). The PEs constituting the dynamic reconfiguration circuit are called a "main program" as described above. The PEs constituting the dynamic reconfiguration circuit are differentiated from a dynamic reconfiguration supporting program related to generation of a driver function file which is a unique function of the embodiment.

Figure 1A:
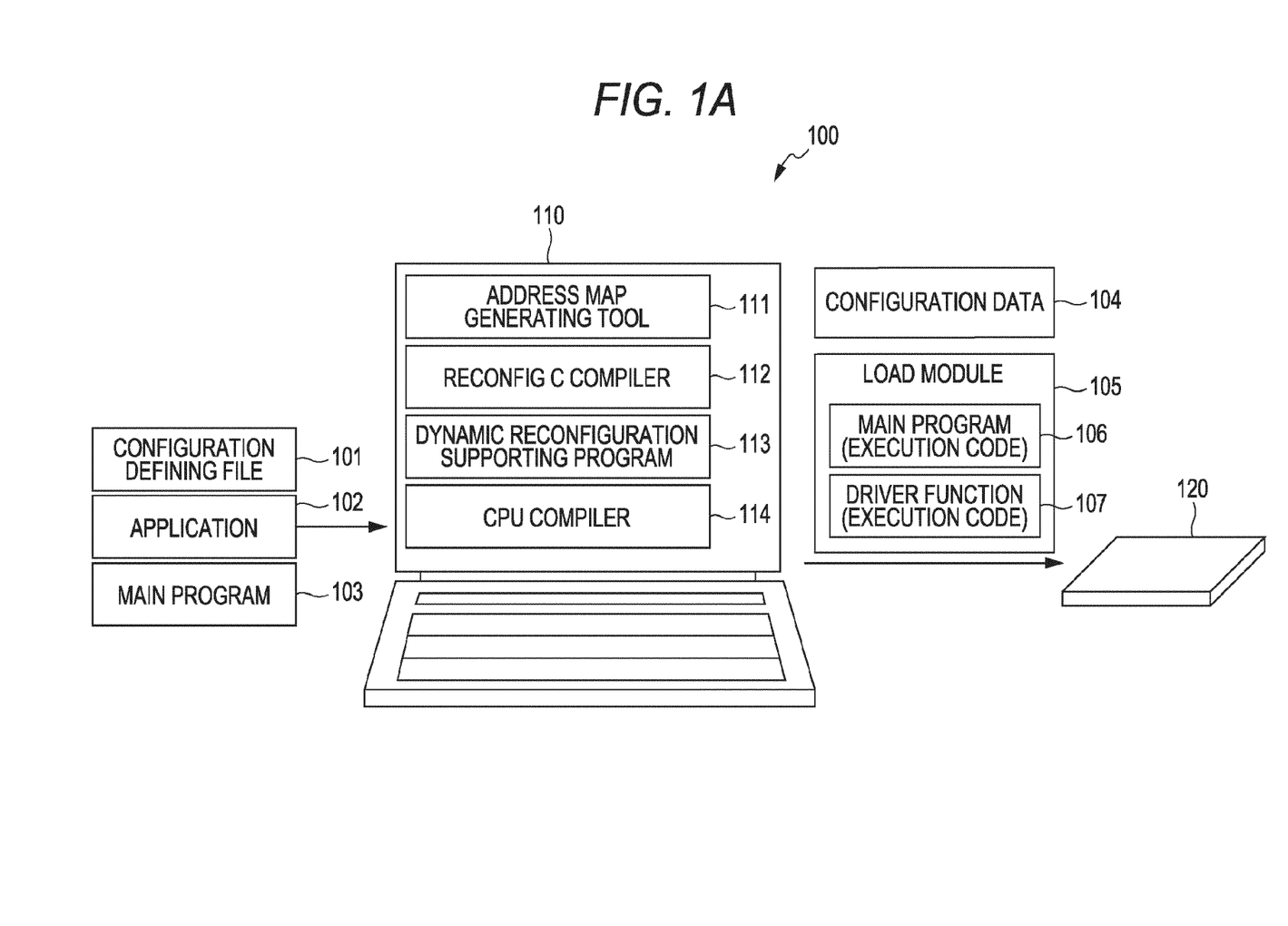
FIG. 1A is an explanatory diagram showing an outline of a dynamic reconfiguration system according to an embodiment.

Outline of Dynamic Reconfiguration System•Configuration of Dynamic Reconfiguration System In the embodiment, an outline of a dynamic reconfiguration system that executes an application by using a driver function file will be described below. FIG. 1A is an explanatory diagram showing an outline of a dynamic reconfiguration system according to the present invention. As shown in FIG. 1A, a dynamic reconfiguration system 100 according to the embodiment causes a PC 110 to generate data (specifically, configuration data 104 and load module 105). The data causes an LSI chip 120 including a dynamic reconfiguration circuit to execute an application 102 prepared by a user.

As shown in FIG. 1A, a user provides a configuration defining file 101, the application 102, and a main program 103 to the PC 110. The configuration defining file 101 is information that expresses configuration contents of PEs of a cluster constituting a dynamic reconfiguration circuit mounted on the LSI chip 120 used in the dynamic reconfiguration system 100.

The application 102 is a descriptor code to perform a predetermined process created by a user. In the embodiment one processing unit defined by a function in the C language is described. The LSI chip 120 causes a reconfig C compiler 112 (which will be described later) to generate configuration data 104 corresponding to the application 102 and a load module 105 in order to cause a dynamic reconfiguration circuit unit 230 to execute a predetermined process described by the LSI chip 120. More specifically, the configuration data 104 and the load module 105 in the LSI chip 120 are executed to make it possible to execute the process of the application 102.

An address map generating tool 111, a reconfig C compiler 112, a dynamic reconfiguration supporting program 113, and a CPU compiler 114 are stored in the LSI chip 120. In this case, the address map generating tool 111 generates an address map representing addresses of PEs constituting the dynamic reconfiguration circuit unit. The reconfig C compiler 112 generates the configuration data 104 to cause the dynamic reconfiguration circuit unit to execute the application 102.

The dynamic reconfiguration support program 113 generates a driver function file of each PE when the application 102 is executed by the dynamic reconfiguration circuit unit. The CPU compiler 114 generates the load module 105 to cause the dynamic reconfiguration circuit unit of the LSI chip 120 to execute the application from the main program 103, the address map generated by the address map generating tool 111, and the driver function file created by the dynamic reconfiguration support program 113.

The load module 105 includes a main program 106 and a driver function 107 to cope with an address change of a circuit configuration element (PE or the like) when a circuit configuration is changed. Both the pieces of information are also generated as execution codes (binary data) to be operated by the CPU compiler 114 on the LSI chip 120.

Outline of Procedure of Dynamic Reconfiguration System

Figure 1B:
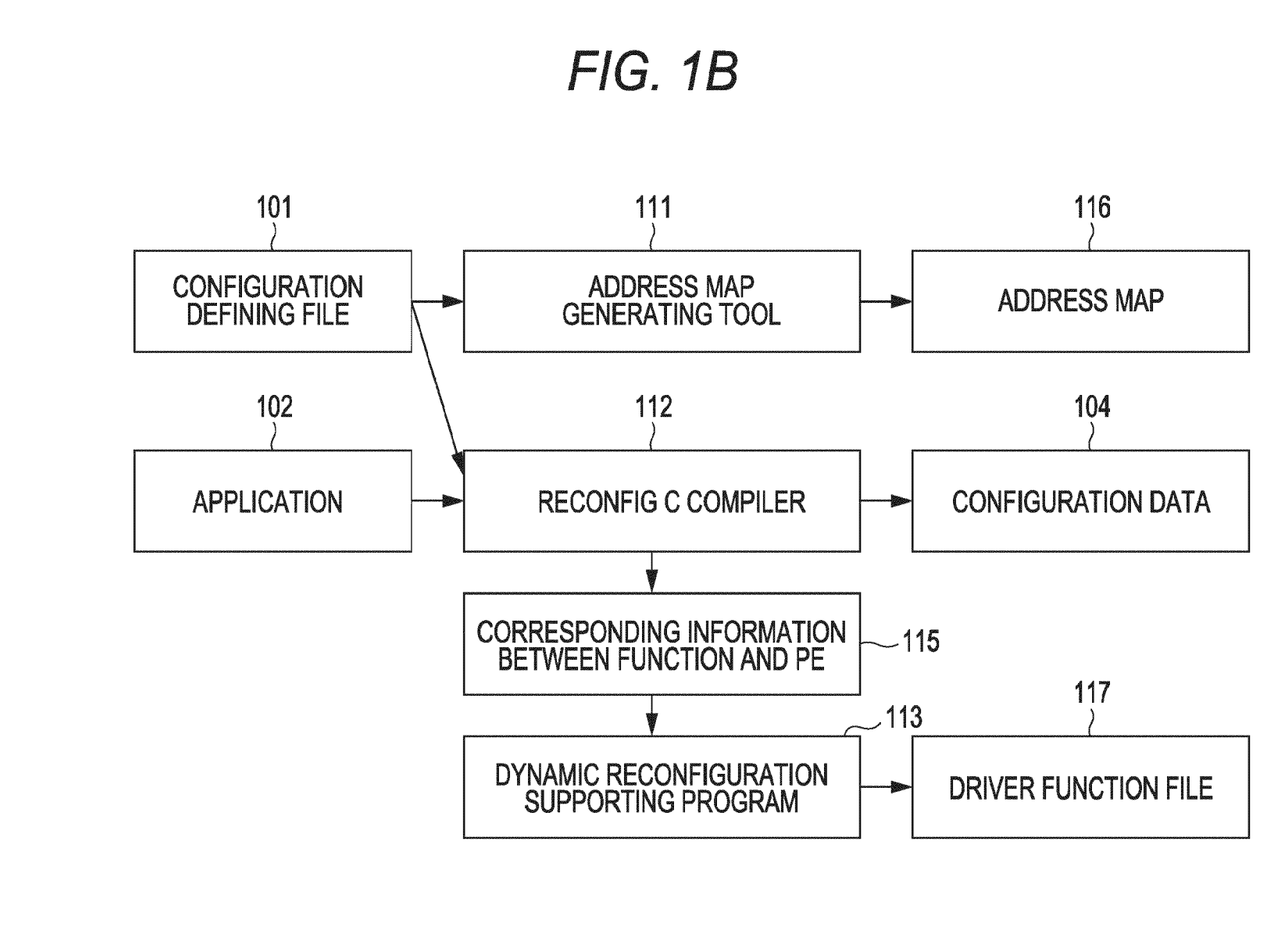
FIG. 1B is an explanatory diagram showing an outline (part 1) of a procedure of the dynamic reconfiguration system.
Figure 1C:
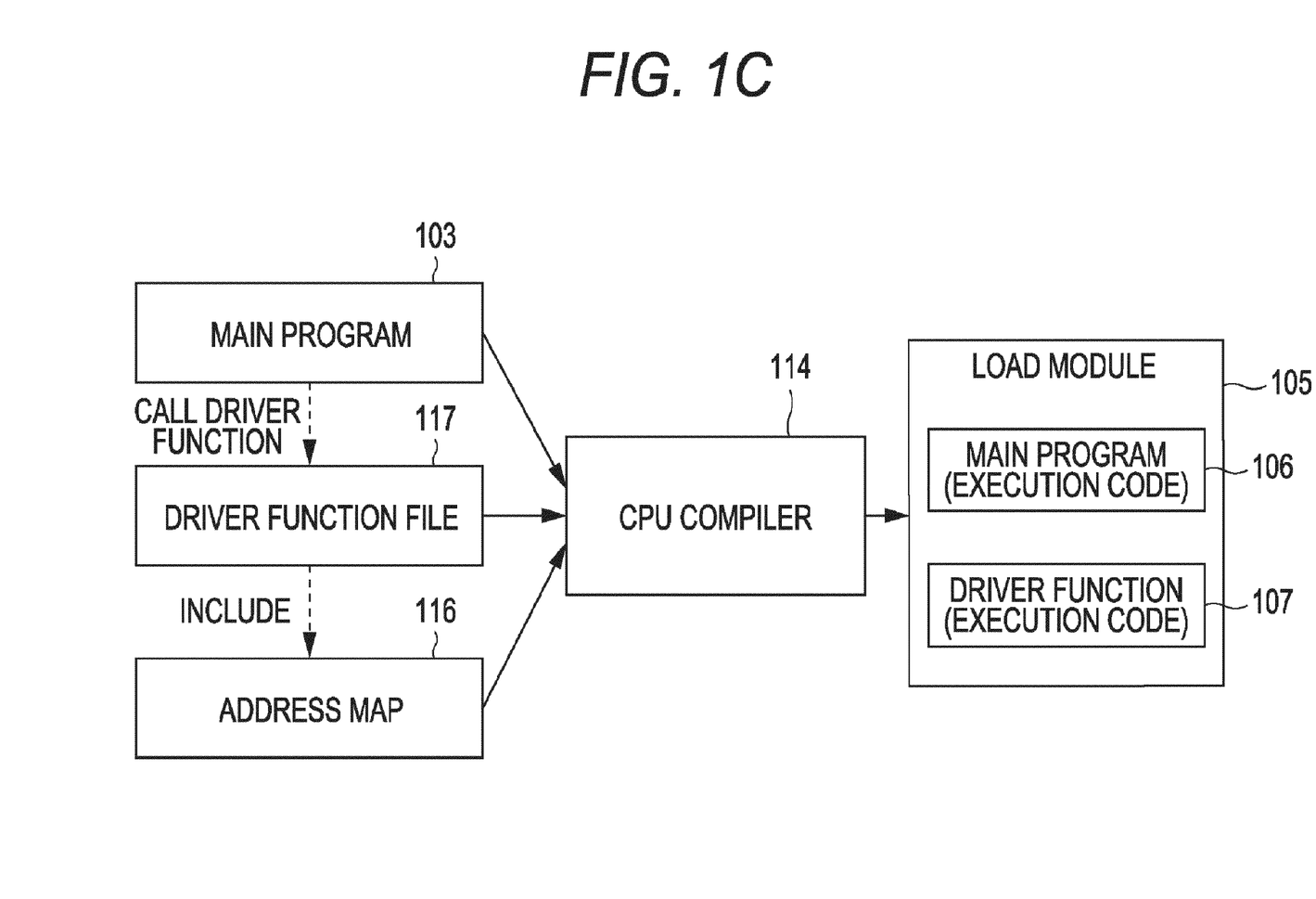
FIG. 1C is an explanatory diagram showing an outline (part 2) of the procedure of the dynamic reconfiguration system.

A procedure performed by the dynamic reconfiguration system 100 will be described below. FIG. 1B and FIG. 1C are explanatory diagrams showing outlines of procedures of the dynamic reconfiguration system. Processes executed by the PC 110 of the dynamic reconfiguration system 100, as shown in FIGS. 1B and 1C, are roughly classified into processes to generate a driver function file and processes to generate a load module.

By using FIG. 1B, a procedure to generate a driver function file will be described below. In the PC 110, the address map generating tool 111 generates an address map 116 from the configuration defining file 101. By the reconfig C compiler 112, the configuration data 104 is generated from the configuration defining file 101 and the application 102.

The reconfig C compiler 112 generates corresponding information between the function of the application 102 and the PE of the dynamic reconfiguration circuit unit 230 together with the configuration data 104. In the reconfig C compiler 112, one or more cluster of one or more context are allocated to the application 102 representing one processing unit. In each of the clusters, a RAM element and a DRF element are allocated as PEs corresponding to arguments, variables, and return values of the functions described in the application 102.

The dynamic reconfiguration supporting program 113 generates a driver function file 117 from corresponding information 115 between the functions generated by the reconfig C compiler 112 and the PEs. The address map 116 and the driver function file 117 which are generated by the above processes are used to generate a load module, and the configuration data 104 is stored in the LSI chip 120.

A procedure to generate the load module will be described below with reference to FIG. 1C. The PC 110 causes the CPU compiler 114 to generate the load module 105 from the main program 103, the driver function file 117, and the address map 116. At this time, the main program 103 is executed to call a driver function, and the driver function file 117 used for the calling is included (incorporated) in the address map 116.

The generated configuration data 104 and the load module 105 are mounted on the LSI chip 120 by the procedure described above to cope with a configuration change of the dynamic reconfiguration circuit unit 230 when the application 102 is executed.

Configuration of Dynamic Reconfiguration Circuit

Figure 2:
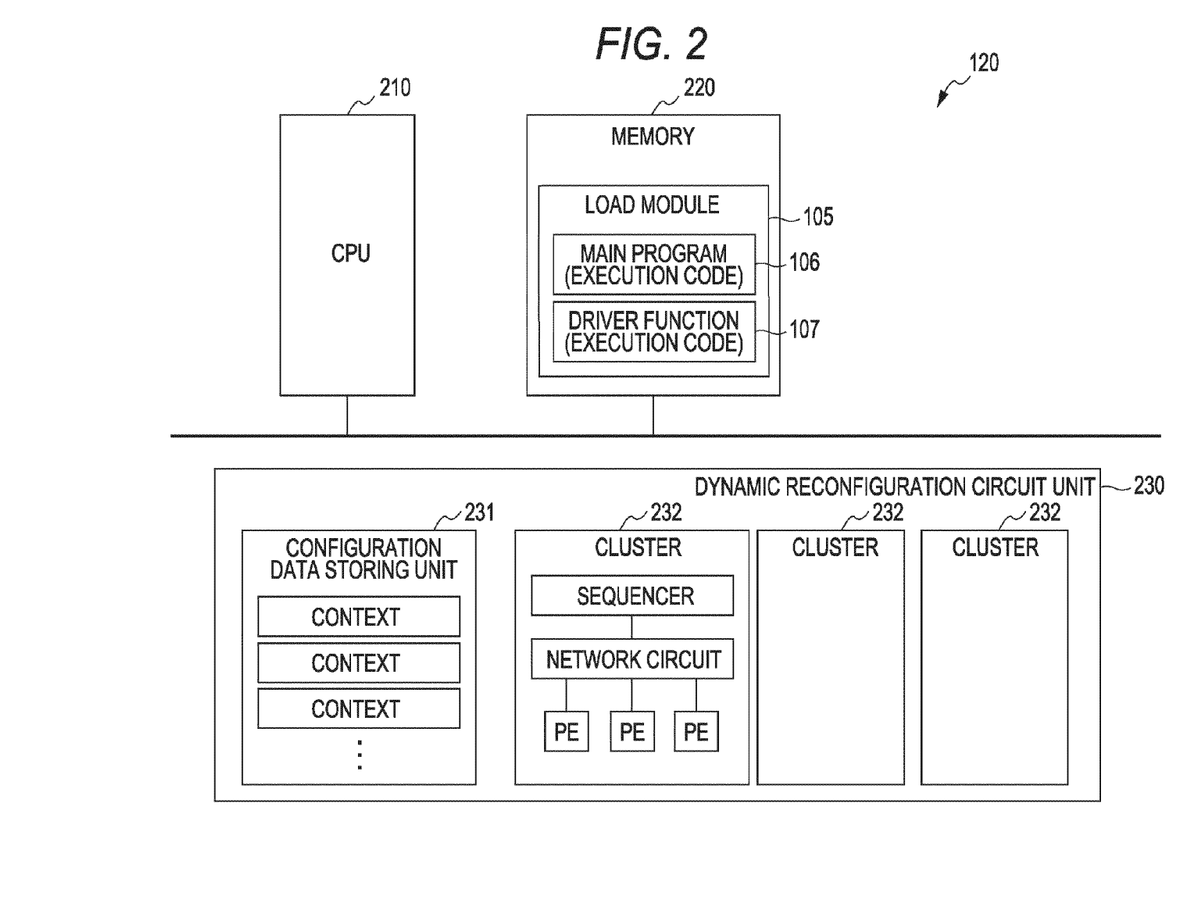
FIG. 2 is a block diagram showing a configuration of a dynamic reconfiguration circuit according to the embodiment.

A configuration of a dynamic reconfiguration circuit mounted on the LSI chip 120 will be described below. FIG. 2 is a block diagram showing the configuration of the dynamic reconfiguration circuit according to the embodiment. As shown in FIG. 2, the LSI chip 120 includes a CPU 210, a memory 220, and the dynamic reconfiguration circuit unit 230 to function as a dynamic reconfiguration circuit. A circuit function other than the function of the dynamic reconfiguration circuit may be mounted on the LSI chip 120. However, only the function of the dynamic reconfiguration circuit will be especially described here.

The CPU 210 controls the overall dynamic reconfiguration circuit. More specifically, the CPU 210 controls the main program 103 to read the load module 105 stored in the memory 220, to start the dynamic reconfiguration circuit 230 or to read or write data in the PEs.

The load module 105 generated by the CPU compiler 114 of the PC 110 is stored in the memory 220. The load module 105 includes the main program 106 and the driver function 107 which are in execution code states. When the CPU 210 receives an external operation designation, the CPU 210 reads the main program (execution code) 106 stored in the CPU 210 to start an operation of the main program 106. Depending on the execution of the main program (execution code) 106 by the CPU 210, the driver function (execution code) 107 is called, and the main program (execution code) 106 is correctly executed in consideration of an address change caused by a configuration change of the dynamic reconfiguration circuit unit 230.

The dynamic reconfiguration circuit unit 230 includes a configuration data storage 231 that stores the configuration data 104 and a cluster 232 that executes a predetermined process depending on the configuration data 104. The configuration data storage 231 is a functional unit that stores, as a context, the configuration data 104 generated by the reconfig C compiler 112. The cluster 232 includes PEs, a network circuit which connect the PEs, and a sequencer which controls switching of contexts.

The dynamic reconfiguration circuit unit 230 includes the above configuration and dynamically switches processing contents (contexts) depending on execution of the main program 106 by the CPU 210 to make it possible to execute a predetermined process depending on the description of the application 102.

The dynamic reconfiguration system 100 according to the embodiment includes the configuration described above and the following characteristics.

1 The dynamic reconfiguration circuit unit 230 stores a plurality of "contexts" that designate the functions of the PEs/connection states between the PEs in one application 102 as in a conventional dynamic reconfiguration circuit, and instantaneously (within several cycles) switches the processing contents on the basis of the contexts in execution of the main program (execution code) 106. A context to be applied to the dynamic reconfiguration circuit unit 230 is designated by the CPU 210 depending on the main program (execution code) 106. The context switching performed at this time is controlled by a sequencer mounted on the dynamic reconfiguration circuit unit 230. Furthermore, a timing of an end of processing by the dynamic reconfiguration circuit unit 230 can be detected (interruption detection or the like) by the main program (execution code) 106 operated on the CPU 210.

2 The dynamic reconfiguration circuit unit 230 can change the number of clusters 232 and a configuration (types/numbers of PEs) of the PEs of each of the clusters 232 in design of a circuit configuration. As the types of the PEs, various computing units, RAMs, data register files (DRFs), and the like are known. Each of the clusters 232 of the dynamic reconfiguration circuit unit 230 can include a plurality of PEs. A cluster configuration and a PE configuration of each of the clusters 232 are designated by the configuration defining file 101.

3 The CPU 210 mounted on the LSI chip 120 can perform the following control to the dynamic reconfiguration circuit unit 230.

Load Process of Configuration Data 231•Writing in PEs (RAM element and DRF element) Depending on Arguments of Function and Variable•Designation of Context for Starting Process•Execution Start of Process•Waiting for Execution End of Process•Reading from PEs depending on Arguments of Function and Variable.

Figure 3:
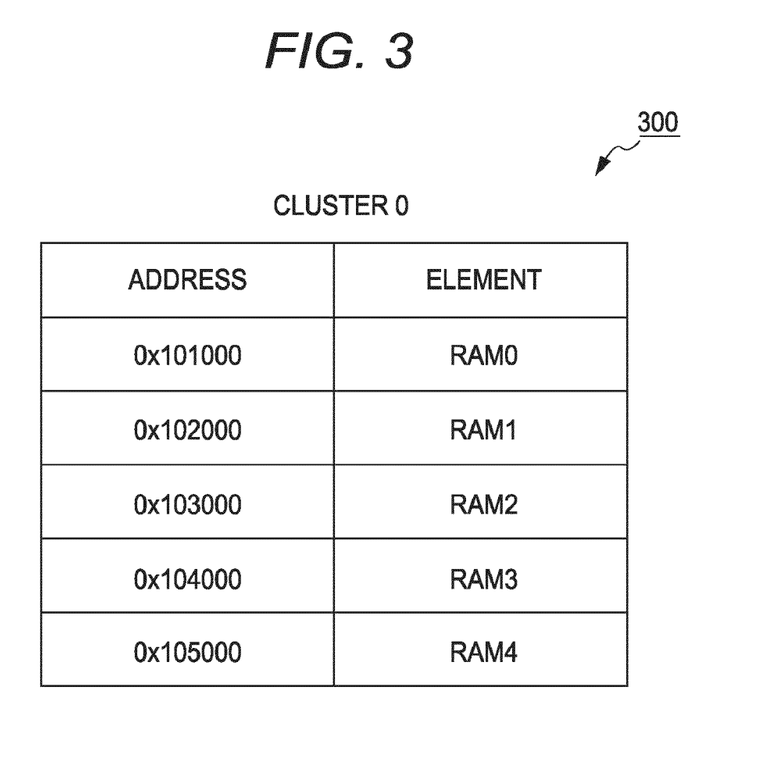
FIG. 3 is an address table showing a cluster constituting a dynamic reconfiguration circuit A.
Figure 4:
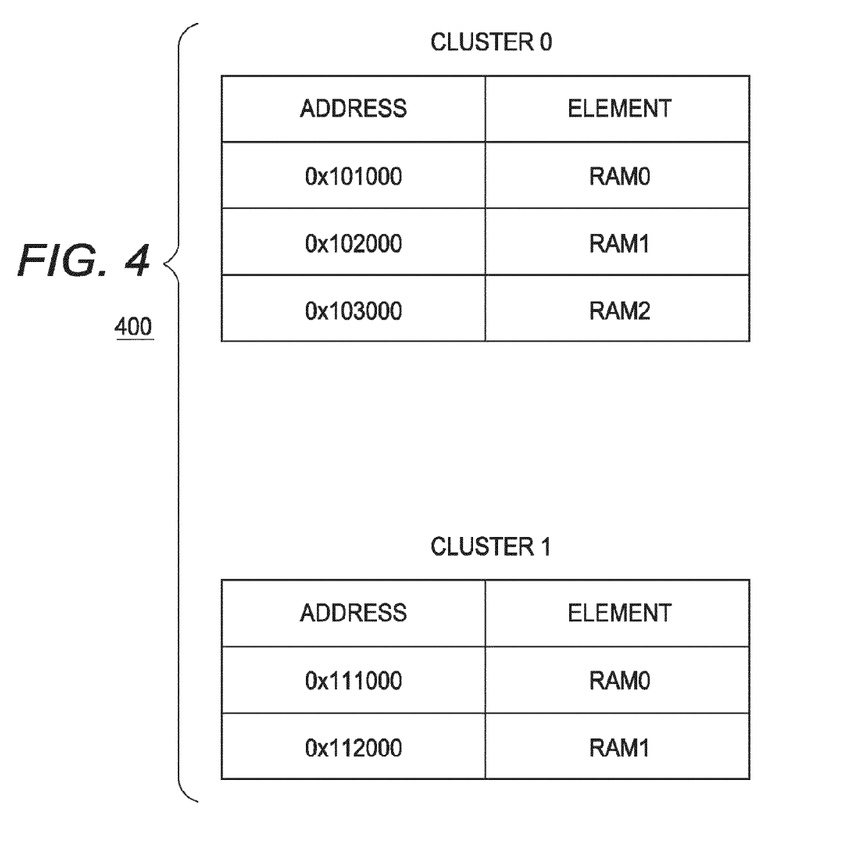
FIG. 4 is an address table showing a cluster constituting a dynamic reconfiguration circuit B.

A change of the circuit configuration of the dynamic reconfiguration circuit will be described below. FIG. 3 is an address table showing a cluster constituting a dynamic reconfiguration circuit A. FIG. 4 is an address table showing a cluster constituting a dynamic reconfiguration circuit B. An explanation of PEs other than the RAM element will be omitted.

The contents of the clusters of the dynamic reconfiguration circuit A and the dynamic reconfiguration circuit B are compared with reference to FIGS. 3 and 4. As shown in a table 300, the dynamic reconfiguration circuit A includes one cluster (cluster 0). As shown in a table 400 in FIG. 4, the dynamic reconfiguration circuit B includes two clusters (cluster 0 and 1). The numbers of PEs (the number of RAM elements in this case) in the clusters change depending on the circuits.

For example, in the application 102, it is assumed that (by the reconfig C compiler 112), five RAM elements are allocated to the argument of the function and the variable and that the main program 106 performs a write/read process to the five RAM elements. When the main program 106 created to be operated by the dynamic reconfiguration circuit A directly uses a value (0x111000 or the like) of an address of the RAM element, in order to also operate the equivalent process in the dynamic reconfiguration circuit B, the value of the address of the RAM element of the main program 106 must be changed in accordance with the dynamic reconfiguration circuit B.

When the RAM elements allocated to an argument of a function and a variable of the application 102 are determined, the reconfig C compiler 112 must optimize each circuit configuration. More specifically, even though the number of clusters in the dynamic reconfiguration circuit and the number of RAM elements in each cluster do not change, if the number of other PEs in each of the clusters changes, different RAM elements may be allocated to the arguments of the function and the variable of the same application 102.

In the dynamic reconfiguration system 100, a driver function file is generated to cope with an address change of a PE depending on the change of the circuit configuration, and an execution code (driver function 107) is generated with reference to the driver function file 117 in execution of an execution code (main program 106) corresponding to the process of the application 102 to realize a process using a correct PE. A procedure of a concrete dynamic reconfiguration supporting process will be described below.

In the embodiment, information that associates an address and a function with each other is called a "driver function". The driver function file 117 is a file showing a specific cluster and a specific PE, which is included in the cluster, to be used when a function described in the application 102 designated by a user. A procedure that creates the driver function file 117 by the dynamic reconfiguration supporting program 112 installed in the PC 110 will be described below.

Generating Procedure for Address Map

Figure 5:
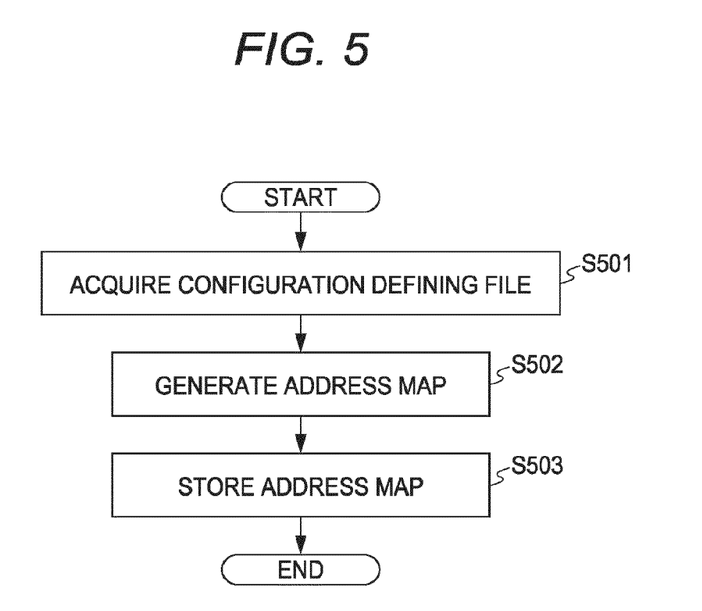
FIG. 5 is a flow chart showing a generating procedure for an address map.

A generating procedure for an address map depending on a configuration of the dynamic reconfiguration circuit unit 230 will be described below. FIG. 5 is a flow chart showing the generating procedure for the address map. In the flow chart in FIG. 5, the configuration defining file 101 expressing the configuration of the dynamic reconfiguration circuit unit 230 is acquired (operation S501).

Figure 6:
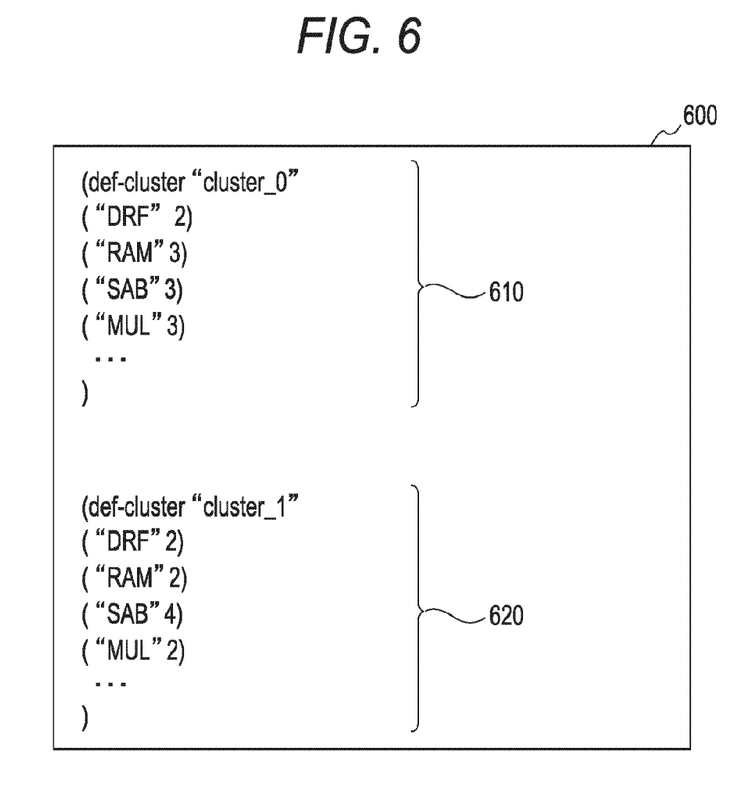
FIG. 6 is a data string showing an example of a configuration defining file.

FIG. 6 is a data string showing an example of the configuration defining file. In a data string 600 of the configuration defining file 101 shown in FIG. 6, pieces of information of a configuration 610 of cluster 0 and a configuration 620 of cluster 1 are set. For example, ("DRF" 2) described in the configuration 610 of cluster 0 expresses that two DRFs including DRF0 and DRF1 are arranged in cluster 0. ("RAM" 3) expresses that three RAMs including RAM0, RAM1, and RAM2 are arranged in cluster 0.

Returning to the explanation of FIG. 5, when the configuration defining file 101 is acquired in operation S501, address information of PEs (RAM and DRF) in each cluster is acquired to generate the address map 116 of the dynamic reconfiguration circuit unit 230 (operation S502). In order to acquire the address information of the PE, for example, the address information may be calculated by using a calculation rule when addresses of PEs in the dynamic reconfiguration circuit are given.

For example, the addresses of the PEs constituting each of the clusters shown in FIGS. 3 and 4 are uniquely given by the following equation 1. The calculation rule may be acquired as another external file.

$$\text{Address of RAM}b \text{ arranged in cluster } a = 0x100000 + 0x1000xa + 0x1000xb + 1000 \tag{1}$$

Figure 7:
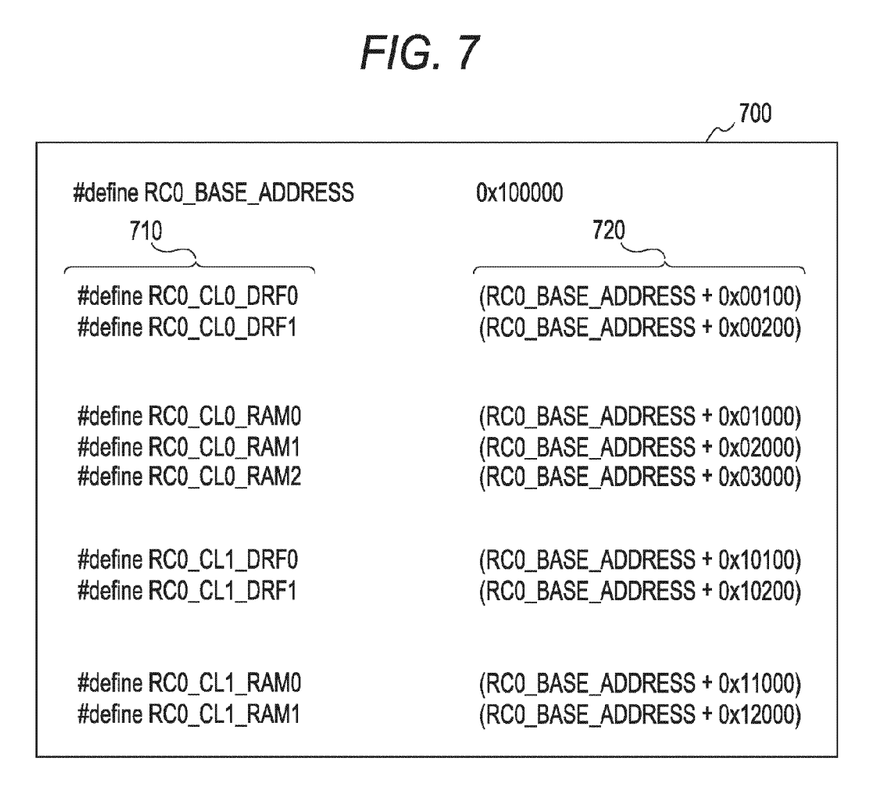
FIG. 7 is a data string showing an example of an address map.

FIG. 7 is a data string showing an example of an address map. The address map 116 generated in operation S502 in FIG. 5 has, for example, a configuration as in a data string 700 in FIG. 7. A first row of the data string 700 expresses a base address of a dynamic reconfiguration circuit 130. The following left half 710 of the data string expresses a name of each PE, and the right half of the data string expresses definition of a macro to acquire an address of each PE. Address map 116 generated as above is stored in PC 110 (operation S503).

Generating Procedure for Driver Function

Figure 8:
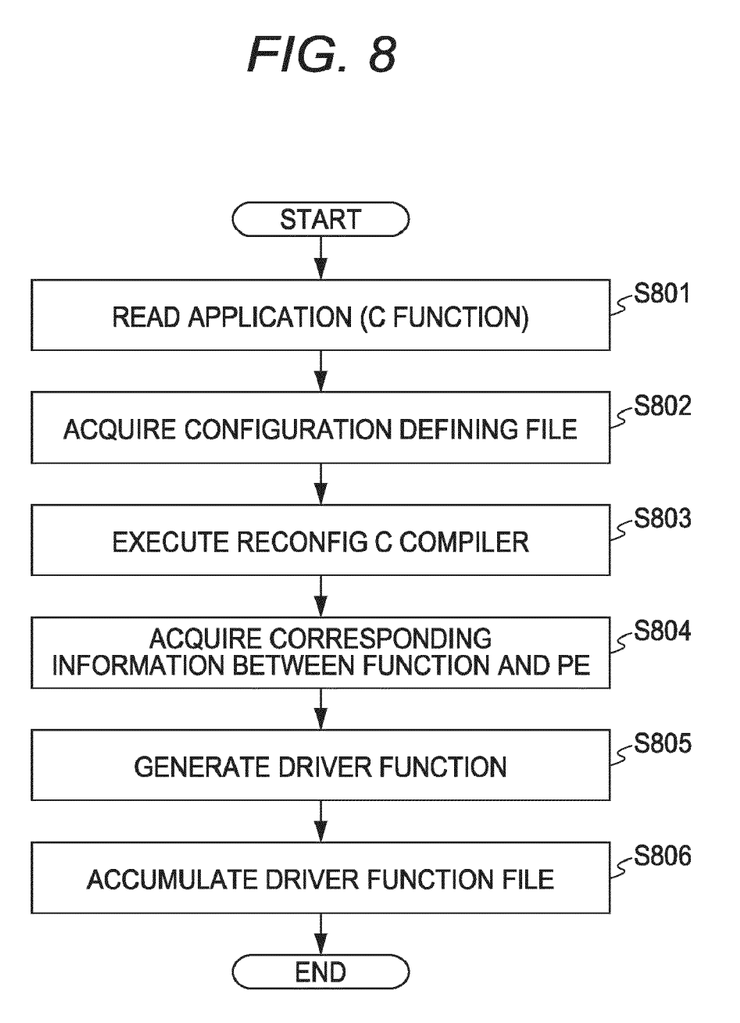
FIG. 8 is a flow chart showing a generating procedure of a driver function.

A generating procedure for a driver function using the generated address map 116 will be described below. FIG. 8 is a flow chart showing the generating procedure for the driver function. In the flow chart in FIG. 8, the application 102 executed by the dynamic reconfiguration circuit unit 230 is read (operation S801).

Figure 9:
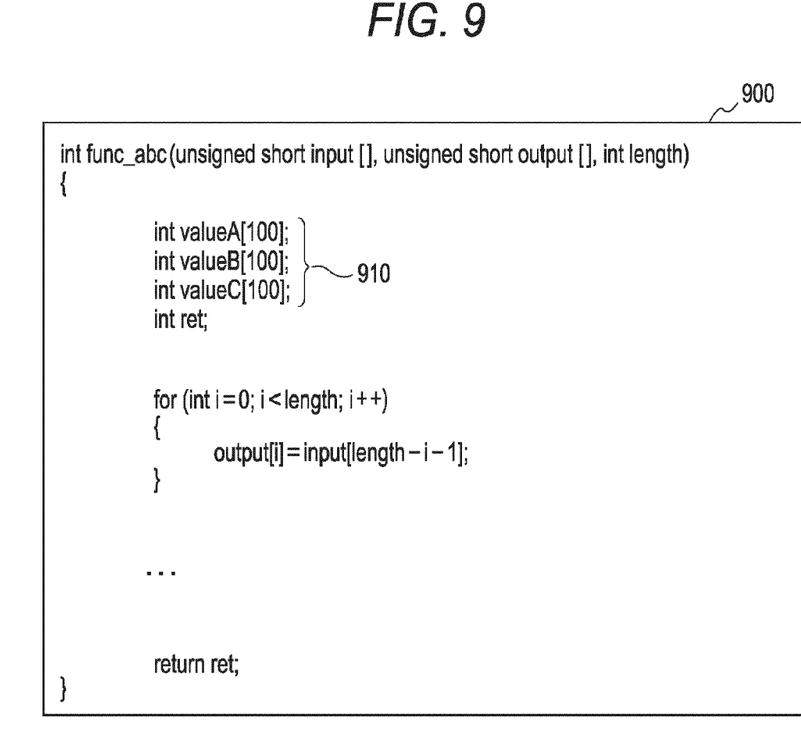
FIG. 9 is a program source showing an example of an application.

FIG. 9 is a program source showing an example of the application. As shown in FIG. 9, in a function of a program source 900, a variable 910 must be referred to. Therefore, PEs such as a RAM and a DRF which store data corresponding to the variable 910 must be allocated.

Therefore, in order to generate the configuration data 104 depending on the LSI chip 120, a configuration defining file of the dynamic reconfiguration circuit unit 230 is acquired (operation S802), and the reconfig C compiler 112 is executed (operation S803). At this time, when a variable of a function described in the application 102 is of a vector type, the reconfig C compiler 112 may be set to allocate a RAM (random access memory) in PEs. When the variable of the function described in the application 102 is of a scalar type, the reconfig C compiler 112 may be set to allocate a DRF (data register file) in the PEs. The process of Operation S801 and Operation S802 described above may be arranged in a random order, or may be processed in parallel.

Figure 10:
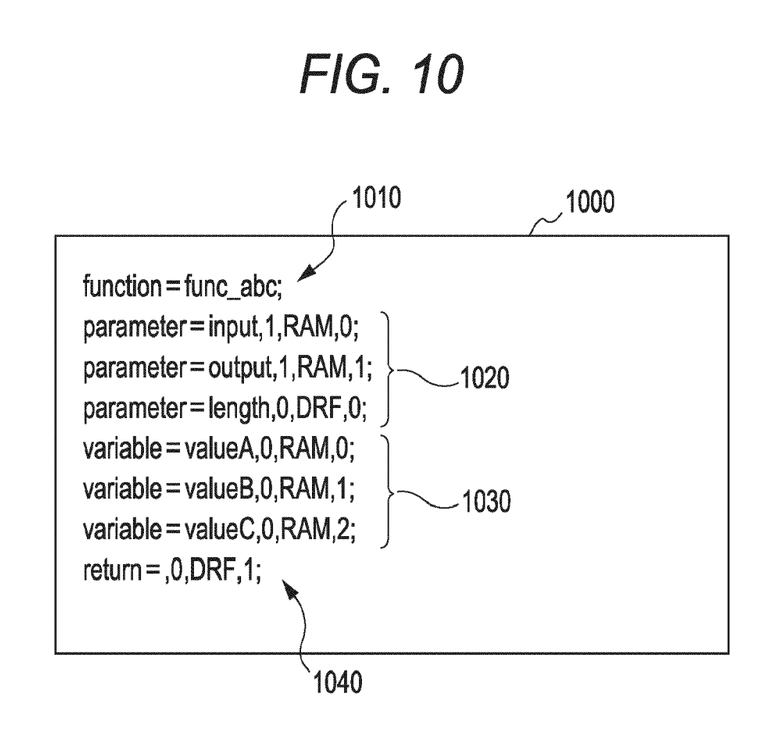
FIG. 10 is a data string showing an example of corresponding information between a function and a PE.

A compile in operation S803 allocates PEs (RAM or DRF) corresponding to functions described in the application 102 to the functions, respectively, and the allocation result is acquired as the corresponding information 115 (see FIG. 1B) between the functions and the PEs (operation S804). In this case, FIG. 10 is a data string showing an example of the corresponding information between the functions and the PEs. In a data string 1000 in FIG. 10, for each function name 1010, corresponding information 1020 between arguments of the functions and the PEs, the corresponding information 1030 between variables and the PEs, corresponding information 1040 between return values and the PEs, and the like are set.

Returning to the explanation of the flow chart in FIG. 8, when the corresponding information 115 between the functions and the PEs are acquired in operation S804, the dynamic reconfiguration supporting program 113 generates a driver function from the corresponding information 115 between the functions and the PEs (operation S805). At this time, the driver function to be generated is associated with an address map described by the flow chart in FIG. 5.

The driver function generated in operation S805 is operated as the driver function 107 of an execution code corresponding to the application 102 and accumulated in the LSI chip 120 as the load module 105 together with the main program 106 serving as the execution code like the driver function 107.

The load module 105 stored in the memory 220 of the LSI chip 120 by the above procedure is arbitrarily read and executed when the CPU 210 accepts an execution designation from the application 102 by a user or a host system.

In execution of the main program 106, an address of a PE of an execution code is replaced with an address of a PE of a dynamic reconfiguration circuit by the driver function 107. This replacement makes the configuration defining file 101 possible to execute a process without erroneously using a PE.

Figure 11:
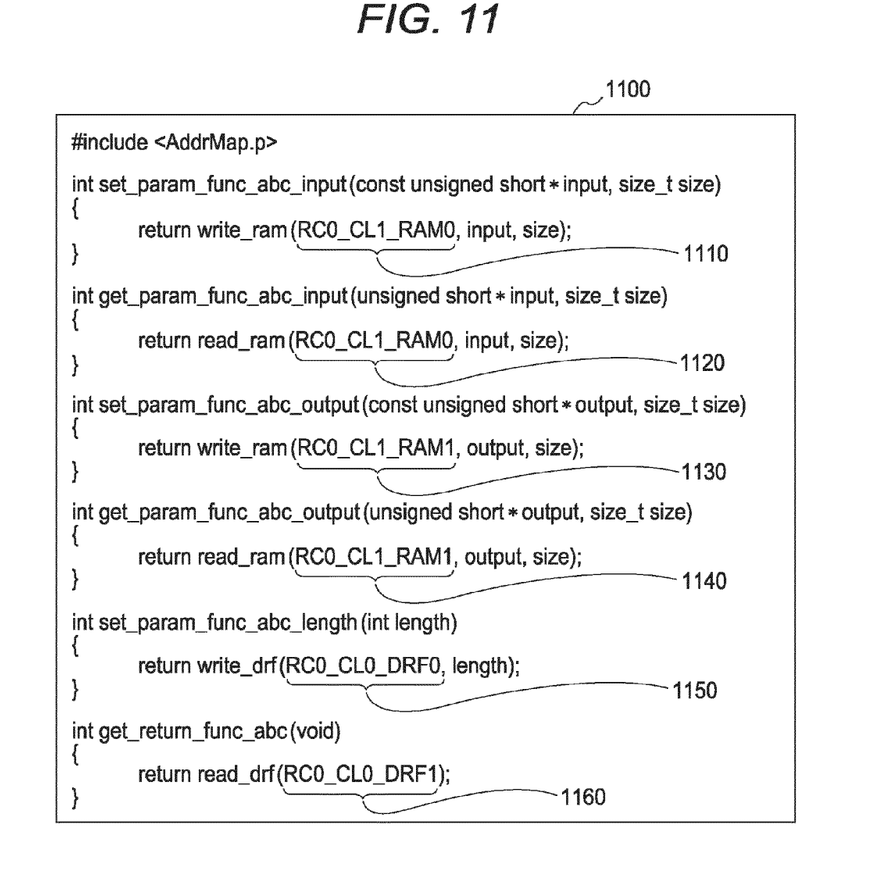
FIG. 11 is a program source showing an example of a driver function file.

FIG. 11 is a program source showing an example of a driver function file. In a concrete example of the above process, as in a program source 1100 in FIG. 11, a driver function name is automatically generated from a function name and a variable name of the application 102 by the dynamic reconfiguration supporting program 112. The driver function generated in operation S805 is applied to an argument and return value portions (1110 to 1160) of the program source 1100.

When the program source 1100 is to be executed, by a macro function in the C language, RC0_CL1_RAM0 (1110) and RC0_CL1 _RAM1 (1120) are replaced with pieces of address information "0x11000" and "0x112000" set by an address map generated in advance, respectively.

As described above, in the past, when the configuration of the dynamic reconfiguration circuit is changed, the code of the main program 106 must be appropriately corrected in accordance with a changed address. However, in the embodiment, the dynamic reconfiguration supporting program 113 may be applied in the configuration change. When the dynamic reconfiguration supporting program 113 is applied, the CPU 210 can properly access a PE without correcting the code of the main program 106, and a process corresponding to the application 102 can be executed. Therefore, a processing load on a user can be considerably reduced.

As described above, in the dynamic reconfiguration supporting program, the dynamic reconfiguration supporting method, the dynamic reconfiguration circuit, and the dynamic reconfiguration system according to the embodiment, even though the configuration of the PE is a changeable dynamic reconfiguration circuit, a designated process can be executed without changing description contents of an application and a main program by a user after the configuration change.

A dynamic reconfiguration supporting method described in the embodiment can be realized such that a program prepared in advance is executed by a computer such as a personal computer or a workstation. This program is recorded on a computer readable recording medium such as a hard disk, a flexible disk, a CD-ROM, an MO, or a DVD and executed such that the program is read from the recording medium by the computer. This program may be a transmission medium which can be distributed through a network such as the Internet.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A dynamic reconfiguration supporting method that generates a driver function to cause a dynamic reconfiguration circuit to execute a program of an application described in a predetermined language, comprising:

acquiring a configuration defining file representing a configuration of a cluster of the dynamic reconfiguration circuit in execution of the process of the application;

generating an address map representing an address of a processing element in the cluster on the basis of the configuration defining file;

generating a driver function that associates the function and the address of the processing element which executes the function with reference to the address map, when a processing element which executes a function described in the application is allocated from the processing element; and creating a driver function file that stores the driver function, further comprising:

storing the driver function file and an execution code that executes the process of the application in a predetermined memory; and replacing the address of a processing element of the execution code executed by the dynamic reconfiguration circuit with an address of a processing element of the dynamic reconfiguration circuit with reference to the driver function file stored in the predetermined memory.

2. A dynamic reconfiguration supporting system that supports execution of a process of an application described in a predetermined language, a circuit configuration of a dynamic reconfiguration circuit including a cluster having a processing element being able to be changed, comprising:

a dynamic reconfiguration supporting apparatus that includes an acquirer that acquires a configuration defining file representing a configuration of a cluster of the dynamic reconfiguration circuit in execution of the process of the application, an address map generator that generates an address map representing an address of a processing element in the cluster on the basis of the configuration defining file, a driver function generator that, when a processing element which executes a function described in the application is allocated from the processing element, generates a driver function that associates the function and an address of the processing element which executes the function with reference to the address map, and a driver function file creator that creates a driver function file contains the driver function;

a storage that stores an execution code to execute the process of the application and the driver function file;

an executor that reads the execution code from the storage to execute the execution code when the execution unit accepts an execution designation of the application; and a replacer that replaces an address of a processing element of the execution code with an address of a processing element of the dynamic reconfiguration circuit with reference to the driver function file stored in the storage in execution of the execution code by the executor.

* * * * *